(12) United States Patent
York et al.

(10) Patent No.: US 10,651,661 B2
(45) Date of Patent: *May 12, 2020

(54) REGULATING CHARGING PORT ATTACH AND DETACH (71) Applicant: Microsoft Technology Licensing, LLC, Redmond, WA (US)

(72) Inventors: Kendall C. York, Bellevue, WA (US); Adam M. Mahood, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/214,792

(22) Filed: Dec. 10, 2018

(65) Prior Publication Data

US 2019/0181662 A1 Jun. 13, 2019

Related U.S. Application Data

(63) Continuation of application No. 15/180,543, filed on Jun. 13, 2016, now Pat. No. 10,186,881.

(60) Provisional application No. 62/311,184, filed on Mar. 21, 2016.

(51) Int. Cl.
  *H01M 10/46* (2006.01)
  *H02J 7/00* (2006.01)
(52) U.S. Cl.
  CPC ............ *H02J 7/0026* (2013.01); *H02J 7/007* (2013.01); *H02J 7/0029* (2013.01); *H02J 7/0045* (2013.01); *H02J 7/0052* (2013.01); *H02J 2007/0039* (2013.01); *H02J 2007/0062* (2013.01)

(58) Field of Classification Search
  CPC ........ H02J 7/355; H02J 7/0042; H02J 7/0085; H02J 7/0086; H02J 2007/0062
  USPC .................................. 320/107, 111, 114, 115
  See application file for complete search history.

(56) References Cited

U.S. PATENT DOCUMENTS 10,186,881 B2 *  1/2019  York ..................... H02J 7/0026

FOREIGN PATENT DOCUMENTS

JP          2013132183 A       7/2013

OTHER PUBLICATIONS

"Universal Serial Bus 3.0 Specification ", In Revision Version 1.0, Jun. 6, 2011, 531 Pages.

(Continued)

*Primary Examiner* — Edward Tso
(74) *Attorney, Agent, or Firm* — Ranjeev Singh; Singh Law, PLLC (57) ABSTRACT

Methods and systems for regulating charging port attach and detach in an electronic device configured to receive a charging current from a charging port are provided. An example method includes automatically detecting a detach from the charging port. The method may further include automatically lowering a current limit associated with the charging current. The method may further include if during a predetermined wait time an attach to the charging port is detected, then ignoring the detach from the charging port and allowing the charging current to charge the electronic device at the lower current limit associated with the charging current. The method may further include if during the predetermined wait time the attach to the charging port is not detected, then initiating a charging port detach process.

20 Claims, 5 Drawing Sheets

(56) References Cited

OTHER PUBLICATIONS

"Universal Serial Bus Specification Revision 2.0", Retrieved from: http://sdphca.ucsd.edu/Lab_Equip_Manuals/usb_20.pdf, Apr. 27, 2000, 650 Pages.
Montag, et al., "Universal Serial Bus Power Delivery Specification", in Revision Version 1.0, Jun. 26, 2013, 328 Pages.
Montag, et al., "USB Power Delivery Specification Revision 1.0", in Revision Version 1.0, Jul. 5, 2012, 303 Pages.
"Office Action Issued in European Patent Application No. 17714334.4", dated Jan. 20, 2020, 6 Pages.
"Micro-USB Interface IC Supporting Universal Charging Solution and Wired Accessories", in Technical Data of Freescale Semiconductor, MC34825, Rev 4.0, Sep. 3, 2014, 39 Pages.

\* cited by examiner

REGULATING CHARGING PORT ATTACH AND DETACH

CROSS REFERENCE TO RELATED APPLICATIONS

This is a continuation application of U.S. application Ser. No. 15/180,543, filed Jun. 13, 2016, issued as U.S. Pat. No. 10,186,881, entitled "REGULATING CHARGING PORT ATTACH AND DETACH," which claims the benefit of U.S. Provisional Application No. 62/331,184, filed Mar. 21, 2016, the entire contents of each of which is incorporated herein by reference.

BACKGROUND

When an electronic device is connected to, and draws current in excess of what can be supplied by, a charging port, with a regulated output limit, the port may react by shutting off output power entirely. This sudden drop in voltage appears to the device to be a disconnection from the charging port, thus causing the device to disconnect and stop charging. A short period later the charging port will recover, and will reassert the voltage, at which point the device perceives a reattach. Without a mitigation in place, this cycle can continue forever and the device will experience rapid attach/detach cycles, the device will not charge, and may ultimately experience catastrophic shutdown, all leading to a poor user experience. Thus, there is a need for methods and systems to prevent the device from experiencing this rapid attach/detach effect.

SUMMARY

In one example, the present disclosure relates to a method for regulating charging port attach and detach in an electronic device configured to receive a charging current from a charging port. The method may include automatically detecting a detach from the charging port. The method may further include automatically lowering a current limit associated with the charging current. The method may further include if during a predetermined wait time an attach to the charging port is detected, then ignoring the detach from the charging port and allowing the charging current to charge the electronic device at the lower current limit associated with the charging current. The method may further include if during the predetermined wait time the attach to the charging port is not detected, then initiating a charging port detach process.

In another example, the present disclosure relates to an electronic device configured to receive a charging current from a charging port. The electronic device may include a charger module, configured to automatically detect a detach from the charging port. The charger module may further be configured to lower a current limit associated with the charging current. The charger module may further be configured to: (1) if during a predetermined wait time an attach to the charging port is detected, then ignore the detach from the charging port and allow the charging current to charge the electronic device at the lower current limit associated with the charging current; and (2) if during the predetermined wait time the attach to the charging port is not detected, then initiate a charging port detach process.

In yet another example, the present disclosure relates to a universal serial bus (USB) device configured to receive a charging current from a charging port. The USB device may further include a USB controller configured to enable data communication with another device. The USB device may further include a charger module, configured to automatically detect a detach from the charging port. The charger module may further be configured to lower a current limit associated with the charging current. The charger module may further be configured to: (1) if during a predetermined wait time an attach to the charging port is detected, then ignore the detach from the charging port and allow the charging current to charge the USB device at the lower current limit associated with the charging current, and (2) if during the predetermined wait time the attach to the charging port is not detected, then initiate a charging port detach process. The charger module may further be configured to provide to the USB controller information concerning at least whether the charging port is attached to the USB device or whether the charging port is detached from the USB device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

DETAILED DESCRIPTION

Examples described in this disclosure relate to regulating charging port attach and detach. While the disclosure refers to a universal serial bus (USB) device as an example, the regulating methods and systems may be used with other types of electronic devices as well. When an electronic device, e.g., a USB device, is connected to, and draws current in excess of what can be supplied by a charging port with a regulated output limit, often times via a fuse, the port may react by shutting off output power entirely. This sudden drop in voltage appears to the device to be a disconnection from the charging port, thus causing the device to disconnect and stop charging. A short period later the USB charging port will recover, and will reassert the voltage, at which point the device perceives a reattach. Without a mitigation in place, this cycle can continue forever and the device will experience rapid USB attach/detach cycles, will not charge, and may ultimately experience catastrophic shutdown, or "brown out", all leading to a poor user experience. Additionally, if the charging port being used is an "accessory charging port" on a primary device's AC adapter or power supply, and if both the accessory port and main device's charging output are both backed by one regulating mechanism (e.g., a single fuse), the rapid cycling and inability to charge will impact the primary device as well. For example, consider the scenario of a user working on a laptop, which has an additional USB charging port on its AC adapter, who plugs a smartphone in to the additional charging port. If the phone attempts to draw more current for charging than the port can provide, and the AC adapter has one fuse backing both the laptop and phone's power outputs, without the mitigation both the laptop and phone will experience the rapid cycling and charging issues.

Figure 1:
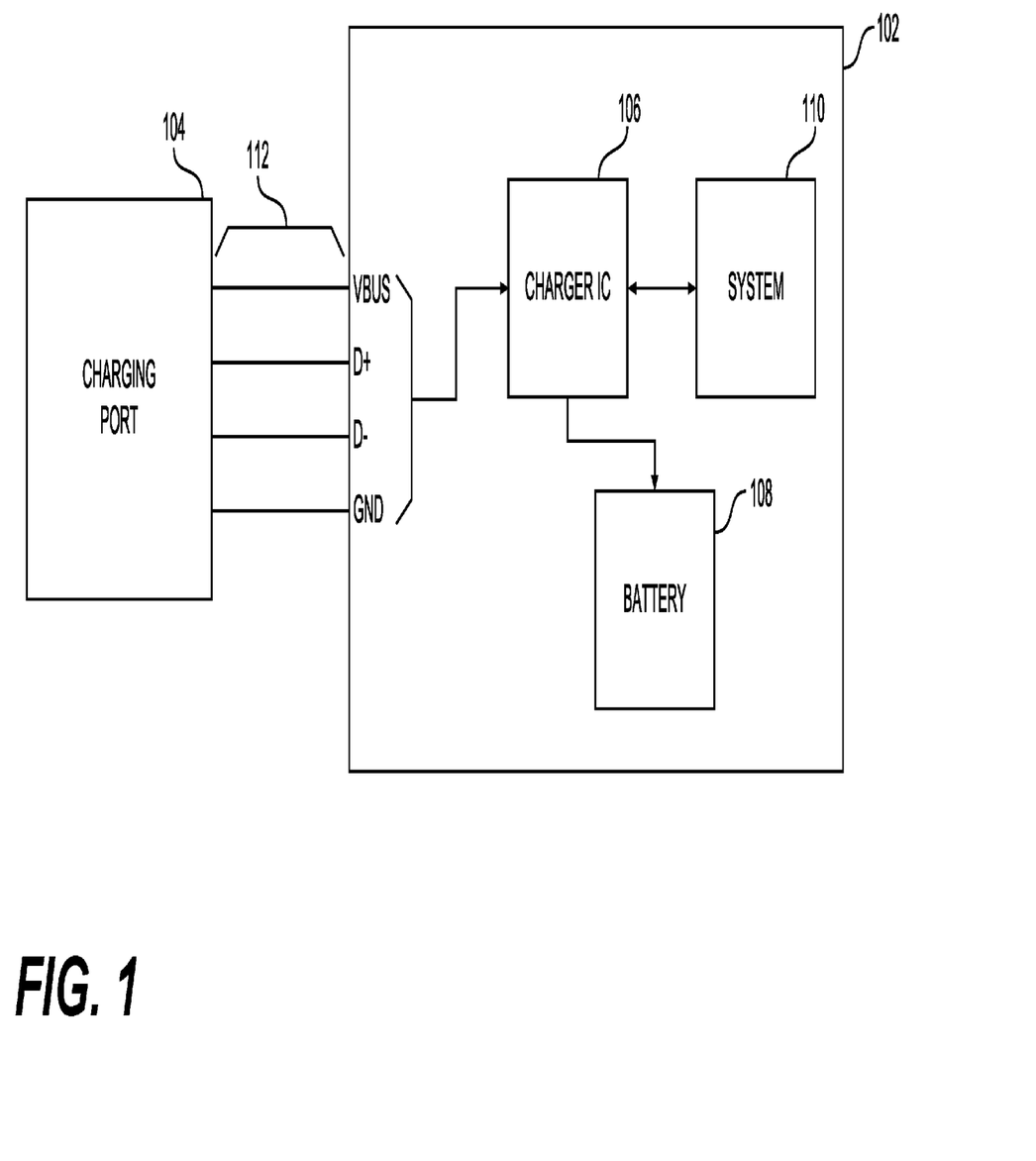
FIG. 1 shows a diagram of an electronic device (e.g., a USB device) coupled to a charging port in accordance with one example.

FIG. 1 shows a diagram of an electronic device 102 (e.g., a USB device) coupled to a charging port 104, in accordance with one example. Electronic device 102 may include a charger integrated circuit (IC) 106, a battery 108, and system 110. In one example, charging port 104 may be coupled via a bus 112 that includes two data lines (D+ and D−) and two other lines (VBUS and GND) for providing power to electronic device 102. The data lines may be used to not only communicate data signals, but also control signals, as needed. Charging port 104 may be a dedicated charging port (DCP). In one example, the DCP may be the charging port, as described by the Battery Charging Specification (BCS) rev. 1.2. In another example, charging port 104 may be a charging downstream port (CDP), as described by BCS rev. 1.2. Charging port 104 may also be other types of charging mechanisms. As an example, charging port 104 may be an accessory charger adaptor (ACA), as described by BCS rev. 1.2. As another example, charging port 104 may be an ACA-Dock or a Micro-ACA, as described by BCS rev. 1.2.

With continued reference to FIG. 1, charger IC 106 may be a circuit that may, in combination with software, perform various power management functions. These functions may include detecting that an electronic device 102 is now attached to a charging port, e.g., charging port 104. Other functions may include controlling various electrical parameters, including voltage and current. As an example, charger IC 106 may control charging of battery 108 by providing voltage/current to battery 108 based on a state of battery 108. Charger IC 106, along with software, may detect when the voltage supply is sufficient to draw an amount of current needed to enable charging of battery 108. Similarly, charger IC 106, along with software, may determine when the voltage is sufficient to allow operation of electronic device 102 for data communication via bus 112. For example, charger IC 106, along with software, may determine when a USB device may communicate data via D+ and D− lines. This process may involve software, such as a USB driver stack and a battery driver stack. The USB driver stack may perform additional functions, such as enumeration and configuration before initiating data transfer. Although FIG. 1 shows a certain number of components of electronic device 102 arranged in a certain manner, there could be more or fewer number of components arranged differently. As an example, charger IC may be a discrete integrated circuit or it may be a part of a power management integrated circuit (PMIC), a system-on-chip (SoC), or a microcontroller. As another example, although FIG. 1 shows charger IC 106 as being coupled to charging port 104 via wires to a voltage supply, charger IC 106 may be coupled wirelessly to charging port 104. In this example, charger IC 106 may instead be coupled to a wireless charging receiver that may receive current wirelessly from a charging port or a similar device.

Figure 2:
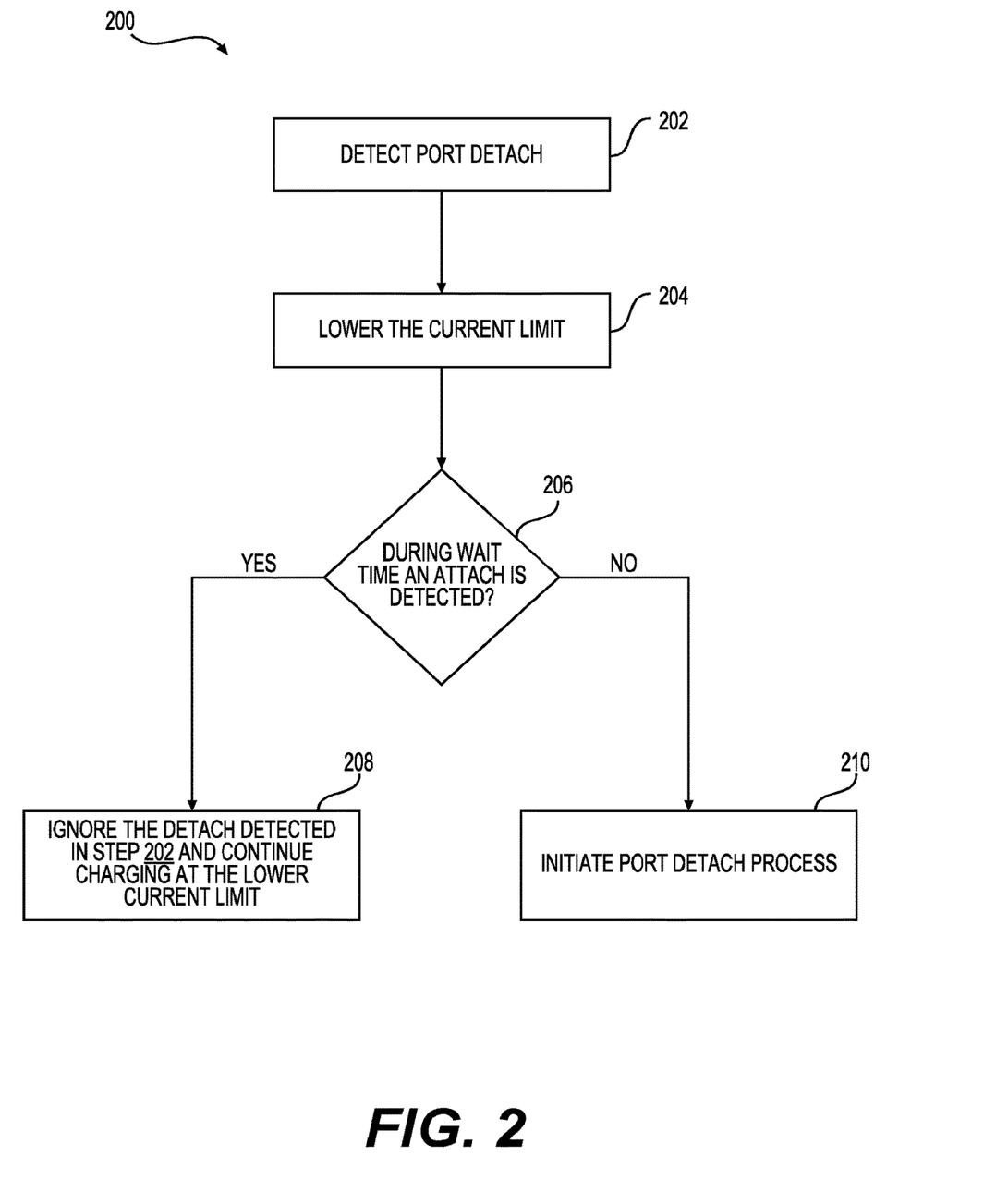
FIG. 2 shows a flow chart for a method for regulating the charging port attach and detach in accordance with one example.

FIG. 2 shows a flow chart 200 for a method for regulating the charging port attach and detach in accordance with one example. In one example, once electronic device 102 is connected to a charging port, it may detect a voltage via charger IC 106. An example electronic device 102 may be a USB device that may receive a nominal voltage of 5 volts. For a USB device, the voltage may be sourced from a dedicated charging port or an upstream host device. If electronic device 102 sets its current limit at a high value (e.g., 1500 milliamps (mA) or above), then when electronic device 102 is connected to charging port 104, charging port 104 may cut-off the current supply to electronic device 102. The current supply may be cut-off as a result of no power or voltage being supplied to electronic device 102. This may result from a mechanism, such as a fuse, that is designed to protect charging port 104 from current flow in excess of its operating rating. In step 202, in this case, charger IC 104 may detect that charging port 104 has detached. In one example, this detection may relate to the disappearance of the voltage at the charging input of electronic device 102. The voltage coupled to the charging input of electronic device 102 may provide a charging current that may be used to charge a battery, such as battery 108. In one example, step 202 may include automatically detecting a detach from the charging port. It is possible that the detach is initiated by a user action terminating a flow of the charging current from the charging port to the electronic device. In response, in step 204 charger IC 104 may lower the value of the variable CURRENT LIMIT, the amount of current charger IC 104 may attempt to draw from charging port 104, to a smaller value. In one example, as part of step 204, charger IC 104 may automatically lower the current limit associated with the charging current. The value of the variable CURRENT LIMIT may be provided to charger IC 106 via software. In one example, the value corresponding to the variable CURRENT LIMIT may be saved in a memory (not shown). As an example, charger IC 104 may lower the value of the variable CURRENT LIMIT from 1500 mA or above to 500 mA. Choosing a high value for the variable CURRENT LIMIT may allow for faster charging on some chargers, but it may exclude lower performing chargers from working with the mitigation altogether. Alternatively, choosing a low value for the variable CURRENT LIMIT may allow compliance with the largest range of chargers, but it may limit charge rate on higher performing chargers. In one example, regardless of whether the detach is initiated by the user or by charging port 104, steps 204 and 206 will be executed. Depending upon the processing in step 206, either step 208 or step 210 may be executed. Alternatively, if electronic device 102 may detect that the detach was caused by the user, then step 204 may not be executed and step 210 may be initiated. In one example, electronic device 102 may classify a detach as a detach that is caused by a user when no current is detected on the data pins (e.g., D+ and D−). If, however, a current is detected on the data pins, then electronic device 102 may classify a detach as a detach that is caused by a charging port (e.g., charging port 104).

Next, in step 206, system 110 may initiate a timer based on a value for the WAIT TIME variable. The WAIT TIME variable may be provided via software. In one example, the value corresponding to the variable WAIT TIME may be saved in a memory (not shown). In step 206, during the time specified by the WAIT TIME variable, if an attach is detected by charger IC 106, then, in step 208, charger IC 106 may ignore the charging port detach detected in step 202. Instead, in step 208, system 110 may allow charging of battery 108, via charger IC, to proceed at the lower current limit of 500 mA. In general, the detection of attach during the WAIT TIME would indicate that electronic device 102 and charging port 104 were able to maintain the charging relationship at a lower current and thereby avoiding the negative behavior. Alternatively, in step 206, during the time specified by the WAIT TIME variable, if an attach is not detected by charger IC 106, then, in step 210, system 110 may initiate the charging port detach process. In one example, the value of the variable WAIT TIME may be set to 500 milliseconds. In another example, the value of the variable WAIT TIME may be set to 600 milliseconds. Even in a situation where the detach was initiated by the user, system 110 may initiate the detach process. The detach process may include not lowering the CURRENT LIMIT further and not initiating the WAIT TIMER. If electronic device 102 is in use, then this process may further include switching the source of the voltage to battery 108. In general, choosing a shorter time duration for the variable WAIT TIME may lower the user impact of the mitigation in the event of a true disconnect, but it may limit the number of different types of chargers that are supported by the method/mitigation. Alternatively, choosing a longer time duration for the variable WAIT TIME may help to support a larger number of different types of chargers, but it may have a negative impact on the user's detach experience, as it may increase the likelihood of having input charging current unintentionally limited upon a rapid manual detach/attach. If a second detach is detected after succeeding with step 206, the method may treat this second detach as a standard, actual detach. This could either occur because the device is actually detached at this point (e.g., the user has disconnected the electronic device from the charging port) or the value for the variable CURRENT LIMIT is still too high for this charger, for the mitigation/method to be successful.

With continued reference to FIG. 2, in one example method, instead of initiating port detach process in step 210, the flow may return to step 204. As part of this modification, in step 204 a lower value for the variable CURRENT LIMIT may be set. The process may then continue through step 206 and onwards. In one example, the number of such iterations may be limited to two. Thus, charger IC 104 may detect a second detach and treat the second detach as if initiated by the user.

In addition, although FIG. 2 describes the mitigation steps based on the detection of the current being cut-off, the method is not limited, as such. For example, in step 202, system 110 may detect a voltage droop as a trigger for lowering the value of the CURRENT LIMIT variable in step 204.

As discussed earlier, electronic device 102 may include software, such as a USB driver stack and a battery driver stack. The USB driver stack may perform additional functions, such as enumeration and configuration before initiating data transfer. In one example, as part of step 206, when a detach is detected the USB driver stack may be notified about the lack of connection, but the battery driver stack may not be notified about the lack of connection. This may help manage the user's experience with the electronic device. Although a USB driver stack is discussed, other types of devices may have other types of stacks. For example, an on-the-go (OTG) device may have an OTG driver stack.

Figure 3:
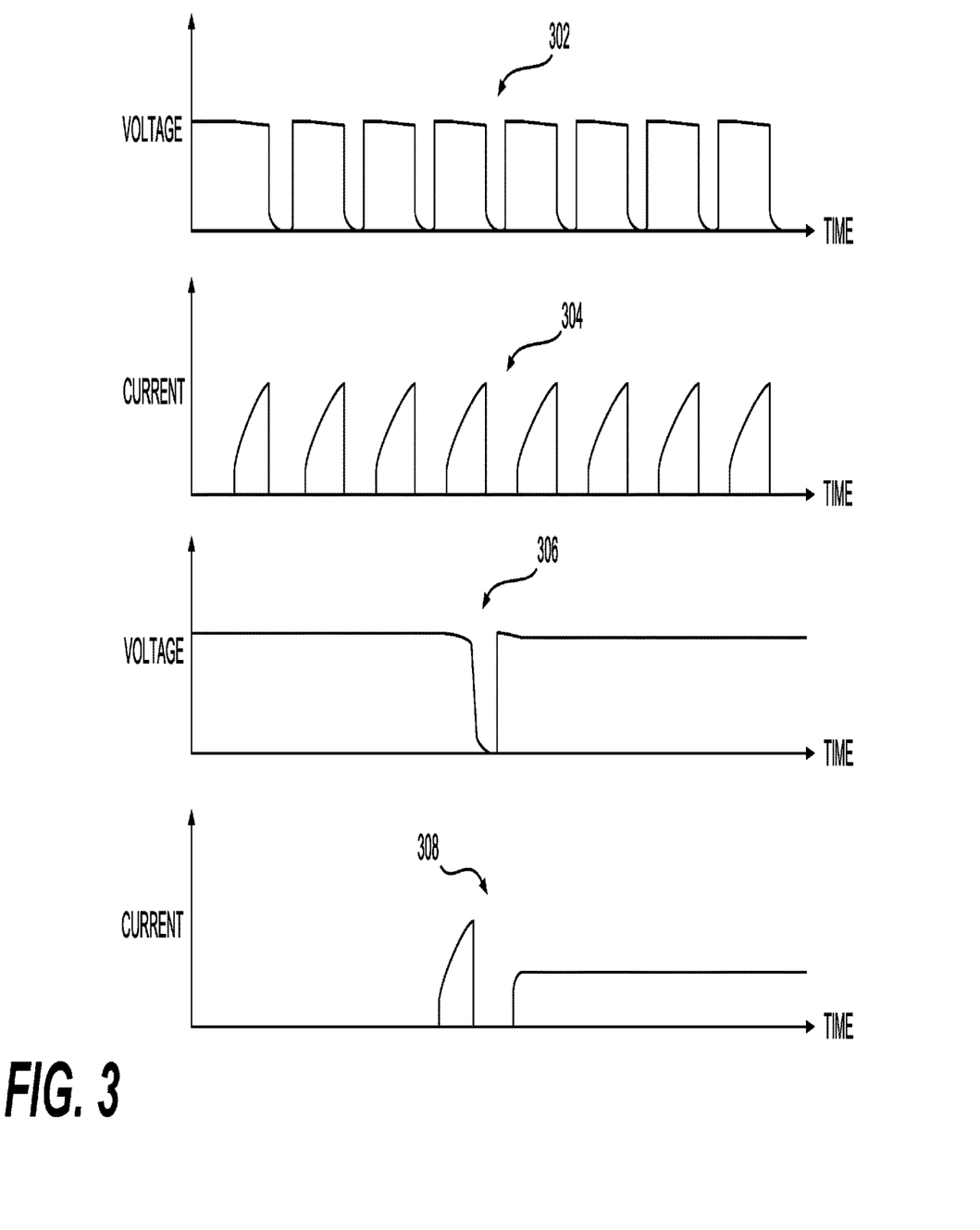
FIG. 3 shows the effect of regulating the charging port attach and detach in accordance with one example.

FIG. 3 shows the effect of regulating the charging port attach and detach in accordance with one example. The upper two waveforms (e.g., 302 and 304) represent the behavior of voltage/current waveforms at the input of an electronic device that does not have the ability to regulate attach and detach consistent with the method of FIG. 2, e.g., the negative behavior requiring mitigation. The lower two waveforms (e.g., 306 and 308) represent the behavior of voltage/current waveforms at the input of an electronic device that has the ability to regulate attach and detach consistent with the method of FIG. 2. The voltage variation with time at the input of an electronic device (that does not implement the method of FIG. 2) is shown via waveform 302. Thus, as shown in waveform 302, the charging port voltage supplied to the electronic device will be cut-off again and again as the current required by the electronic device will continue to exceed the value that is sufficient for a corresponding charging port to cut off the voltage supply. As a result, the current at the input of the electronic device will be represented by waveform 304. Similar to the voltage behavior, the current will also be cut-off and then provided again and then cut off again. Unlike this behavior, an electronic device that implements the method of FIG. 2 will show different behavior. Thus, as shown in waveform 306, the first time the voltage is cut-off the electronic device may adjust the current limit to a lower value. In turn, this will prevent the charging port from exceeding its current limit and cutting off the voltage supply. As shown in waveform 308, the current limit will be lowered from a first value to a second value. As long as the second value is lower than the maximum current for which the charging port is rated, the electronic device will continue to charge at a lower current as explained above with respect to FIG. 2.

Figure 4:
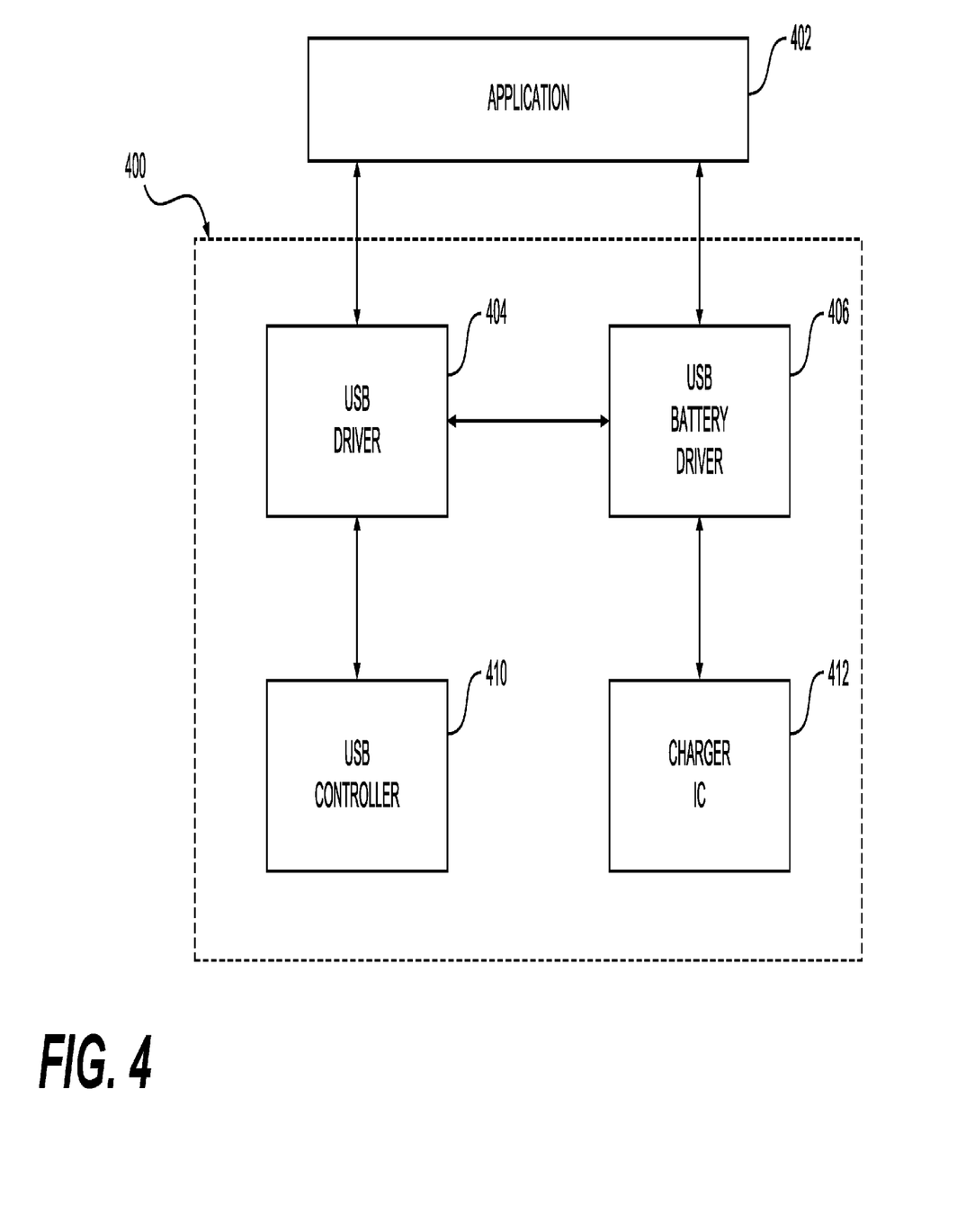
FIG. 4 shows a diagram of a universal serial bus (USB) device with a charger IC for regulating charging port attach and detach in accordance with one example.

FIG. 4 shows a diagram of a universal serial bus (USB) device 400 with a charger IC for regulating charging port attach and detach, in accordance with one example. In this example, USB device 400 may communicate with an application 402 via an operating system (not shown). In the present example, USB device 400 may include a USB driver 404, a USB battery driver 406, a USB controller 410, and a charger IC 412. Application 402 may access the functionality provided by USB device 400 via an operating system or an application framework or both. USB driver 404 may be configured for a USB device to allow the USB device to communicate with application 402 or other software components or applications. USB driver 404 may further be configured to manage USB controller 410. USB controller 410 may be implemented in hardware. USB controller 410 may provide the functionality associated with the USB protocol, such as USB 2.0, USB 3.0, or other versions of the USB protocol. USB battery driver 406 may manage charger IC 412 and any batteries (not shown in this figure) associated with USB device 400. As an example, USB battery driver 406 may cooperate with other components, including charger IC 412, of USB device 400 to perform the steps of the method shown in FIG. 2. In one example, USB device 400 may communicate with a USB host (not shown), which may act as a downstream charging port, using the USB protocol. As part of the communication with the charging port, USB device 400 may receive information regarding a current limit associated with the charging port. In this case, USB device 400 may not perform the steps associated with the method shown in FIG. 2; instead USB device 400 may draw current from the charging port at the limit communicated by the charging port. Although FIG. 4 shows a certain number of components of USB device 400 arranged in a certain manner, there could be more or fewer number of components arranged differently. As an example, USB device 400 may include a battery and other components. In addition, USB device 400 may be an On-The-Go (OTG) USB device, such that it may act in both host mode and a peripheral mode, as needed.

Figure 5:
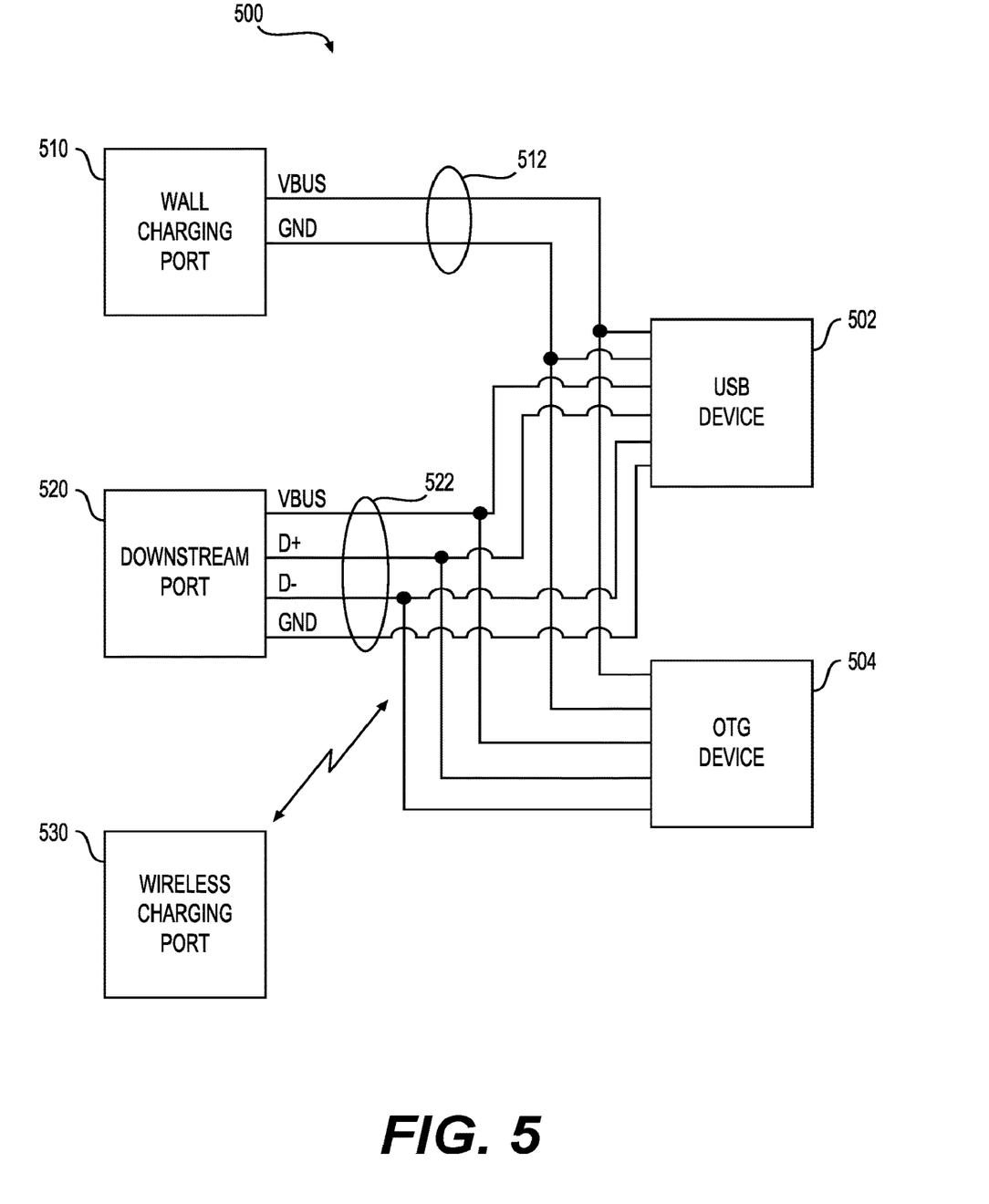
FIG. 5 shows a diagram of a system including a USB device and an On-The-Go (OTG) device coupled to various types of charging ports in accordance with one example.

FIG. 5 shows a diagram of a system 500 including a USB device 502 and an On-The-Go (OTG) device 504 in accordance with one example. Any of a USB device 502 or an OTG device may be capable of receiving a charging current from any of a wall charging port 510, a downstream port 520, or a wireless charging port 530. As an example, each of USB device 502 and OTG device 504 may receive a charging current, via a cable 512, from wall charging port 510. Cable 512 may have any of the various types of connectors for receiving a charging current, including Type-A, Type-B, Type-A SuperSpeed, Type-B SuperSpeed, Mini-A, Micro-A, Micro-B, Micro-B SuperSpeed, or Type-C. Wall charging port 510 may include charging ports that are dedicated charging ports, such as wall ports or auto adapters that do not enumerate using the USB protocol. In another example, each of USB device 502 and OTG device 504 may receive a charging current, via a cable 522, from downstream port 520. Downstream port 520 may be a standard downstream port for use with desktop computers, laptop computers, tablets or other such devices, as defined by USB 2.0 specification. While such a port may require enumeration before charging, a USB device connected to the port may ignore this requirement. This is another reason why the implementation of the method described in FIG. 2 may advantageously improve user experience. Downstream port 530 may also be a charging downstream port as described by BCS rev. 1.2.

In another example, each of USB device 502 and OTG device 504 may receive a charging current wirelessly from wireless charging port 530. Each of one the charging ports may have a maximum operating current rating. The operating ratings for the charging ports may vary and neither USB device 502 nor OTG device 504 may have any advance knowledge of the operating ratings of the charging ports. If USB device 502 while coupled to downstream port 520 draws a higher amount of current from downstream port 520, then downstream port 520 may cut-off the voltage supply to USB device 502. This may result from a mechanism, such as a fuse, that is designed to protect the respective charging port from current flow in excess of its operating rating. As explained earlier with respect to FIG. 2, this may result in a cycle of attach and detach. To prevent that from happening, USB device 502 may execute the method discussed with respect to FIG. 2. Although FIG. 5 shows a certain types of charging ports and devices, there could be other types of charging ports and devices coupled differently. As an example, a charging port may be an accessory charger adaptor (ACA), as described by BCS rev. 1.2. As another example, a charging port may be an ACA-Dock or a Micro-ACA, as described by BCS rev. 1.2.

In conclusion, in one example, the present disclosure relates to a method for regulating charging port attach and detach in an electronic device configured to receive a charging current from a charging port. The method may include automatically detecting a detach from the charging port. The method may further include automatically lowering a current limit associated with the charging current. The method may further include if during a predetermined wait time an attach to the charging port is detected, then ignoring the detach from the charging port and allowing the charging current to charge the electronic device at the lower current limit associated with the charging current. The method may further include if during the predetermined wait time the attach to the charging port is not detected, then initiating a charging port detach process. The detach may be automatically initiated by the charging port. Automatically detecting the detach from the charging port may include detecting a change a voltage received by the electronic device from the charging port. In one example, the change in the voltage received by the electronic device may correspond to a voltage supplied by the charging port being reduced to nominally zero. In another example, the change in the voltage received by the electronic device may correspond to a voltage supplied by the charging port dropping below a predetermined threshold. The method may further include, in response to detecting a second detach, after the detach, treating the second detach as a detach initiated by a user.

In another example, the present disclosure relates to an electronic device configured to receive a charging current from a charging port. The electronic device may include a charger module, configured to automatically detect a detach from the charging port. The charger module may further be configured to lower a current limit associated with the charging current. The charger module may further be configured to: (1) if during a predetermined wait time an attach to the charging port is detected, then ignore the detach from the charging port and allow the charging current to charge the electronic device at the lower current limit associated with the charging current; and (2) if during the predetermined wait time the attach to the charging port is not detected, then initiate a charging port detach process. The detach may be automatically initiated by the charging port. The charger module may be configured to detect a change in a voltage received by the electronic device from the charging port. In one example, the change in the voltage received by the electronic device may correspond to a voltage supplied by the charging port being reduced to nominally zero. In another example, the change in the voltage received by the electronic device may correspond to a voltage supplied by the charging port dropping below a predetermined threshold. The charger module may further be configured to, in response to detecting a second detach, after the detach, treat the second detach as a detach initiated by a user. The electronic device may include a battery and the charger module may be configured to provide a current to charge the battery.

In yet another example, the present disclosure relates to a universal serial bus (USB) device configured to receive a charging current from a charging port. The USB device may further include a USB controller configured to enable data communication with another device. The USB device may further include a charger module, configured to automatically detect a detach from the charging port. The charger module may further be configured to lower a current limit associated with the charging current. The charger module may further be configured to: (1) if during a predetermined wait time an attach to the charging port is detected, then ignore the detach from the charging port and allow the charging current to charge the USB device at the lower current limit associated with the charging current, and (2) if during the predetermined wait time the attach to the charging port is not detected, then initiate a charging port detach process. The charger module may further be configured to provide to the USB controller information concerning at least whether the charging port is attached to the USB device or whether the charging port is detached from the USB device. The detach may be automatically initiated by the charging port. The charger module may be configured to detect a change in a voltage received by the electronic device from the charging port. In one example, the change in the voltage received by the electronic device may correspond to a voltage supplied by the charging port being reduced to nominally zero. In another example, the change in the voltage received by the electronic device may correspond to a voltage supplied by the charging port dropping below a predetermined threshold. The charger module may further be configured to, in response to detecting a second detach, after the detach, treat the second detach as a detach initiated by a user. The electronic device may include a battery and the charger module may be configured to provide a current to charge the battery.

It is to be understood that the methods, modules, and components depicted herein are merely exemplary. Alternatively, or in addition, the functionality described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality.

The functionality associated with some examples described in this disclosure can also include instructions stored in a non-transitory media. The term "non-transitory media" as used herein refers to any media storing data and/or instructions that cause a machine to operate in a specific manner. Exemplary non-transitory media include non-volatile media and/or volatile media. Non-volatile media include, for example, a hard disk, a solid state drive, a magnetic disk or tape, an optical disk or tape, a flash memory, an EPROM, NVRAM, PRAM, or other such media, or networked versions of such media. Volatile media include, for example, dynamic memory such as DRAM, SRAM, a cache, or other such media. Non-transitory media is distinct from, but can be used in conjunction with transmission media. Transmission media is used for transferring data and/or instruction to or from a machine. Exemplary transmission media, include coaxial cables, fiber-optic cables, copper wires, and wireless media, such as radio waves.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed:

1. A non-transitory computer-readable medium comprising instructions corresponding to a method for regulating charging port attach and detach in an electronic device configured to receive a charging current from a charging port, the method comprising:
   automatically detecting a detach from the charging port;
   automatically lowering a current limit associated with the charging current;
   if during a predetermined wait time an attach to the charging port is detected, then ignoring the detach from the charging port and allowing the charging current to charge the electronic device at the lower current limit associated with the charging current; and
   if during the predetermined wait time the attach to the charging port is not detected, then initiating a charging port detach process.

2. The non-transitory computer-readable medium of claim 1, wherein the detach is automatically initiated by the charging port.

3. The non-transitory computer-readable medium of claim 1, wherein the automatically detecting the detach from the charging port comprises detecting a change in a voltage received by the electronic device from the charging port.

4. The non-transitory computer-readable medium of claim 3, wherein the change in the voltage received by the electronic device corresponds to a voltage supplied by the charging port being reduced to nominally zero.

5. The non-transitory computer-readable medium of claim 3, wherein the change in the voltage received by the electronic device corresponds to a voltage supplied by the charging port dropping below a predetermined threshold.

6. The non-transitory computer-readable medium of claim 1, wherein the method further comprising if during the predetermined wait time the attach to the charging port is detected, in response to detecting a second detach, after an elapse of the predetermined wait time, treating the second detach as a detach initiated by a user.

7. An electronic device configured to receive a charging current from a charging port, the device comprising:
   a charger system, configured to automatically detect a detach from the charging port;
   the charger system further configured to lower a current limit associated with the charging current; and
   the charger system further configured to:
      if during a predetermined wait time an attach to the charging port is detected, then ignore the detach from the charging port and allow the charging current to charge the electronic device at the lower current limit associated with the charging current; and if during the predetermined wait time the attach to the charging port is not detected, then initiate a charging port detach process.

8. The electronic device of claim 7, wherein the detach is automatically initiated by the charging port.

9. The electronic device of claim 7, wherein the charger system is further configured to detect a change in a voltage received by the electronic device from the charging port.

10. The electronic device of claim 9, wherein the change in the voltage received by the electronic device corresponds to a voltage supplied by the charging port being reduced to nominally zero.

11. The electronic device of claim 9, wherein the change in the voltage received by the electronic device corresponds to a voltage supplied by the charging port dropping below a predetermined threshold.

12. The electronic device of claim 7, wherein the charger system is further configured to, if during the predetermined wait time the attach to the charging port is detected, in response to detecting a second detach, after an elapse of the predetermined wait time, treat the second detach as a detach initiated by a user.

13. The electronic device of claim 7 further comprising a battery, wherein the charger system is configured to provide a current to charge the battery, and wherein the charging port is a wireless charging port.

14. A smartphone configured to receive a charging current from a charging port, the smartphone comprising:
 a USB controller configured to enable data communication with another device;
 a charger system, configured to automatically detect a detach from the charging port;
 the charger system further configured to lower a current limit associated with the charging current;
 the charger system further configured to:
  if during a predetermined wait time an attach to the charging port is detected, then ignore the detach from the charging port and allow the charging current to charge the smartphone at the lower current limit associated with the charging current, and
  if during the predetermined wait time the attach to the charging port is not detected, then initiate a charging port detach process; and
 the charger system further configured to provide to the USB controller information concerning at least whether the charging port is attached to the smartphone or whether the charging port is detached from the smartphone.

15. The smartphone of claim 14, wherein the detach is automatically initiated by the charging port.

16. The smartphone of claim 14, wherein the charger system is further configured to detect a change in a voltage received by the smartphone from the charging port.

17. The smartphone of claim 16, wherein the change in the voltage received by the smartphone corresponds to a voltage supplied by the charging port being reduced to nominally zero.

18. The smartphone of claim 16, wherein the change in the voltage received by the smartphone corresponds to a voltage supplied by the charging port dropping below a predetermined threshold.

19. The smartphone of claim 14, wherein the charger system is further configured to, if during the predetermined wait time the attach to the charging port is detected, in response to detecting a second detach, after an elapse of the predetermined wait time, treat the second detach as a detach initiated by a user.

20. The smartphone of claim 14 further comprising a battery, wherein the charger system is configured to provide a current to charge the battery, and wherein the charging port is a wireless charging port.

* * * * *